(12) United States Patent
Hoffmann

(10) Patent No.: US 6,958,470 B2
(45) Date of Patent: Oct. 25, 2005

(54) SCANNING MICROSCOPE WITH A DETECTOR AND LIGHT SOURCE FOR EXCITING AN ENERGY STATE IN A SPECIMEN AND MODULE FOR A SCANNING MICROSCOPE

(75) Inventor: Juergen Hoffmann, Wiesbaden (DE)

(73) Assignee: Leica Microsystems Heidelberg GmbH (DE)

( * ) Notice: Subject to any disclaimer, the term of this patent is extended or adjusted under 35 U.S.C. 154(b) by 203 days.

(21) Appl. No.: 10/066,582

(22) Filed: Feb. 6, 2002

(65) Prior Publication Data

US 2002/0104961 A1 Aug. 8, 2002

(30) Foreign Application Priority Data

Feb. 6, 2001 (DE) .......................................... 101 05 391

(51) Int. Cl.[7] .................................................. H01J 3/14
(52) U.S. Cl. ...................................... 250/234; 359/385
(58) Field of Search .................... 250/234, 201.1–201.3, 250/216, 306, 307, 458.1, 459.1, 461.1, 461.2; 359/368, 385

(56) References Cited

U.S. PATENT DOCUMENTS

| 5,252,834 | A | * | 10/1993 | Lin ........................ 250/458.1 |
| 5,731,588 | A | | 3/1998 | Hell et al. ................ 250/458.1 |
| 5,866,911 | A | * | 2/1999 | Baer ........................ 250/458.1 |
| 6,094,300 | A | * | 7/2000 | Kashima et al. ............ 359/385 |
| 6,222,961 | B1 | | 4/2001 | Engelhardt et al. |
| 6,320,196 | B1 | * | 11/2001 | Dorsel et al. ............ 250/458.1 |
| 2002/0063220 | A1 | | 5/2002 | Engelhardt et al. |

FOREIGN PATENT DOCUMENTS

| DE | 196 33 185 A1 | 10/1997 |
| DE | 199 14 049 A1 | 10/2000 |
| DE | 100 56 382 A1 | 5/2002 |
| EP | 0 801 759 | 8/2001 |
| WO | 95/21393 | 8/1995 |

* cited by examiner

Primary Examiner—Thanh X. Luu
(74) Attorney, Agent, or Firm—Foley & Lardner LLP

(57) ABSTRACT

The invention discloses a scanning microscope for optical measurement with high spatial resolution of a specimen point of a specimen, having a light source for emitting an exciting light beam suitable for exciting an energy state of the specimen; a detector for detection of the emitted light; and a stimulating light beam, coming from the light source, for generating stimulated emission of the specimen excited by the exciting light beam at the specimen point, the exciting light beam and the stimulating light beam being arranged in such a way that their intensity distributions in the focal region partially overlap, wherein optical elements which shape the stimulating light beam are combined into at least one module that is positionable in the beam path of the scanning microscope.

17 Claims, 4 Drawing Sheets

SCANNING MICROSCOPE WITH A DETECTOR AND LIGHT SOURCE FOR EXCITING AN ENERGY STATE IN A SPECIMEN AND MODULE FOR A SCANNING MICROSCOPE

CROSS REFERENCE TO RELATED APPLICATIONS

This invention claims priority of the German patent application 101 05 391.6-42 which is incorporated by reference herein.

FIELD OF THE INVENTION

The invention concerns a scanning microscope and a module for a scanning microscope. The invention concerns in particular a scanning microscope and a module for a scanning microscope for optical measurement with high spatial resolution of a point of a specimen.

BACKGROUND OF THE INVENTION

In scanning microscopy, a specimen is illuminated with a light beam in order to observe the reflected or fluorescent light emitted from the specimen. The focus of the illuminating light beam is moved by means of a controllable beam deflection device (generally by tilting two mirrors) in one specimen plane; the deflection axes are usually perpendicular to one another, so that one mirror deflects in the X and the other in the Y direction. Tilting of the mirrors is brought about, for example, with galvanometer positioning elements. The power level of the light coming from the specimen is measured as a function of the position of the scanning beam. The positioning elements are usually equipped with sensors to ascertain the present mirror position. Also known, in addition to these so-called "beam scanning" methods, are scanning microscopes having a spatially stationary illuminating light beam, in which the specimen is moved by means of a precision positioning stage for scanning. These are called "specimen scanning" microscopes.

In confocal scanning microscopy specifically, a specimen is scanned in three dimensions with the focus of a light beam.

A confocal scanning microscope generally comprises a light source, a focusing optical system with which the light of the source is focused onto a pinhole (called the excitation pinhole), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen arrives via the beam deflection device back at the beam splitter, passes through it, and is then focused onto the detection pinhole, behind which the detectors are located. Detected light that does not derive directly from the focus region takes a different light path and does not pass through the detection pinhole, so that a point datum is obtained which, by sequential scanning of the specimen, results in a three-dimensional image. Usually a three-dimensional image is achieved by acquiring image data in layers.

The power level of the light coming from the specimen is measured at fixed time intervals during the scanning operation, and thus sampled one grid point at a time. The measured value must be unequivocally associated with the relevant scan position so that an image can be generated from the measured data. Advantageously, the status data of the adjusting elements of the beam deflection device are also continuously measured for this purpose, or—although this is less accurate—the setpoint control data of the beam deflection device are used directly.

In a transmitted-light arrangement, for example, it is also possible to detect the fluorescent light or the transmission of the exciting light on the condenser side. The detected light beam then does not pass via the scanning mirror to the detector (non-descan configuration). In the transmitted-light configuration, a condenser-side detection pinhole would be necessary for detection of the fluorescent light in order to achieve three-dimensional resolution as in the descan arrangement described. In the case of two-photon excitation a condenser-side detection pinhole can be dispensed with, however, since the excitation probability is a function of the square of the photon density (proportional to $[\text{intensity}]^2$), which of course is much higher at the focus than in the adjacent regions. The great majority of the fluorescent light to be detected therefore derives with high probability from the focus region, which makes superfluous any further differentiation, using a pinhole arrangement, between fluorescent photons from the focus region and fluorescent photons from the adjacent regions.

The resolution of a confocal scanning microscope is defined, inter alia, by the intensity distribution and the spatial extension of the focus of the exciting light beam. An arrangement for increasing the resolution of a confocal scanning microscope for fluorescent applications is known from PCT/DE/95/00124. Here the lateral edge regions of the focus volume of the exciting light beam are illuminated with a light beam of a different wavelength (called the "stimulating light beam") that is emitted by a second laser, so that the specimen regions excited there by the light of the first laser are brought back to the ground state in stimulated fashion. Only the light spontaneously emitted from the regions not illuminated by the second laser is then detected, so that the overall result is an improvement in resolution. The term "stimulated emission depletion" (STED) has become established for this method.

A new development has shown that a resolution improvement can be simultaneously achieved both laterally and axially if the focus of the stimulating light beam can be made internally hollow. This is done by introducing into the beam path of the stimulating light beam a round $\lambda/2$ plate which has a diameter smaller than the beam diameter and is therefore overilluminated.

Microscopes for STED microscopy are very complex and difficult to align, since the focus of the exciting light beam must always have a fixed spatial relationship to the focus of a stimulating light beam. This problem becomes very particularly difficult in beam-scanning systems, since in these systems the foci of the exciting light beam and the detected light beam must be guided over or through the specimen simultaneously and in stationary fashion with respect to one another.

Scanning microscopes for STED microscopy that are implemented on an optical bench are very bulky and, because of their size, very difficult to protect against external influences such as mechanical vibrations or environmental temperature fluctuations. For this reason, only specimen-scanning systems have so far been implemented. Because of the complexity involved, scanning microscopes cannot be converted for STED microscopy by retrofitting conventional scanning microscopes.

SUMMARY OF THE INVENTION

It is therefore the object of the invention to disclose a scanning microscope for optical measurement with high spatial resolution of a specimen point of a specimen that can be implemented easily, in particular also by retrofitting or conversion of a conventional scanning microscope.

The object is achieved by a scanning microscope comprising: a light source that emits an exciting light beam which is suitable for exciting an energy state in the specimen and that emits a stimulating light beam for generating stimulated emission in the specimen, whereby the exciting light beam and the stimulating light beam overlap in a focal region at least partially, at least one detector for detection of the emitted light proceeding from the specimen and a module that is positionable in the beam path of the scanning microscope and that comprises multiple optical elements which shape the stimulating light beam.

A further object of the invention is to disclose a module for shaping a stimulating light beam that solves in simple fashion the problems described above in implementing a scanning microscope for optical measurement with high spatial resolution of a specimen point of a specimen.

The object is achieved by a module comprising:
means for positioning the module in the beam path of the scanning microscope and multiple optical elements for shaping a stimulating light beam.

The invention has the advantage that the outlay for implementing an ultrahigh-resolution scanning microscope by combining essential optical elements that shape the stimulating light beam into a module is considerably reduced.

In addition to the optical elements for shaping the stimulating light beam, the module can also contain elements for beam guidance, beam spreading, or focusing. All the optical elements within the module are aligned with one another, and the entire module has an alignment device that allows easy positioning within the beam path of a scanning microscope. The overall alignment effort is thereby considerably reduced.

An optical element for shaping the stimulating light beam can be a retardation plate, preferably a λ/2 plate, that is transilluminated by a portion of the stimulating light beam. Other elements, such as for example LCD elements, are also usable for shaping the focus of the stimulating light beam in the specimen. LCD elements have the advantage that the LCD grid elements can be individually addressed electronically, and the shape of the focus of the stimulating light beam can be adapted to current scanning conditions. In particular, it is possible to modify the shape of the focus during the sampling operation or during scanning.

In very particularly advantageous fashion, the shaping elements are arranged and controlled in such a way that the focus of the stimulating light beam in the specimen is internally hollow, since a resolution enhancement in all spatial directions is thereby possible.

It is particularly stable to equip the module with a baseplate on which the optical elements are mounted. The baseplate preferably has a low coefficient of thermal expansion. It is also possible to actively temperature-control the baseplate or the entire module. An electrical control circuit having a Peltier element can be provided for this purpose.

It is very particularly favorable to equip the scanning microscope with banking surfaces that define an exact working position of the module in which the module is securely immobilized. Ideally, no further alignment of the module is then necessary. In particularly advantageous fashion, bayonet attachments are provided for positioning and immobilizing the module.

For protection from external influences, the module possesses a housing. The housing can be of dust-tight configuration.

In very particularly advantageous fashion, the module is adaptable to a conventional scanning microscope, thus making possible access to ultrahigh-resolution scanning microscopy by simple retrofitting. Utilization of the scanning microscope in conventional fashion also remains unaffected, since the module is removable without great effort.

In a particular embodiment, the module contains the light source, in particular the part of the light source that generates the stimulating light beam. Lasers, in particular pulsed lasers, are used principally as the light source. Diode lasers, solid-state lasers, dye lasers, and gas lasers are usable in particular in this context. The use of a light source that contains photonic band gap material is also possible; this can comprise, for example, a pulsed laser downstream from which is arranged a light-guiding fiber made of photonic band gap material.

The stimulating light can also be transported to the module from an external light source using a light-guiding fiber. The module has a coupling optical system to couple light out of the light-guiding fiber. It is very particularly advantageous in this context to equip the module with standardized light-guiding fiber plugs or bushings.

The scanning microscope can also, in particular, be configured as a confocal scanning microscope.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
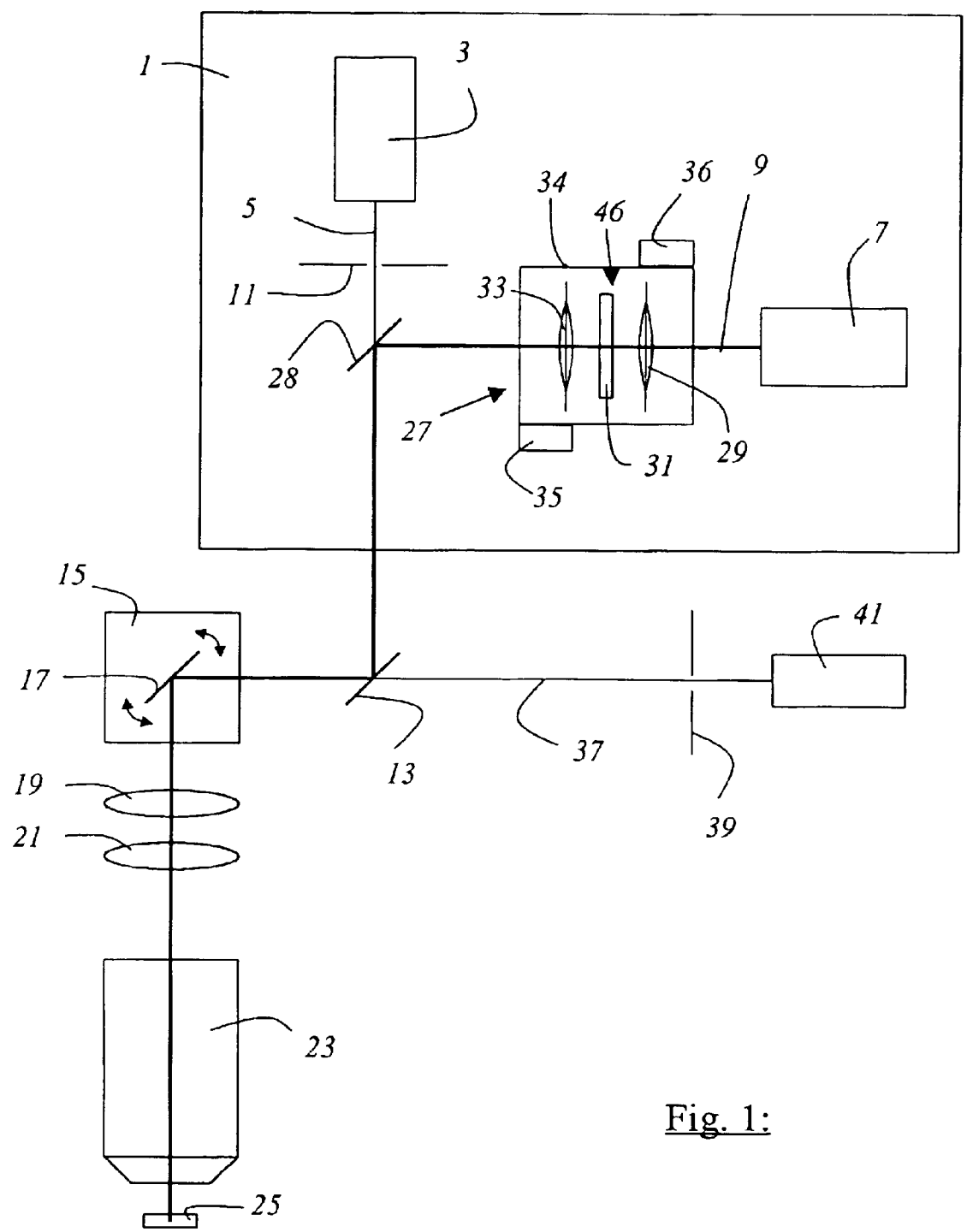
FIG. 1 shows a scanning microscope according to the present invention.

FIG. 1 shows a scanning microscope according to the present invention that is embodied as a confocal scanning microscope.

The scanning microscope contains a light source 1 that comprises a first laser 3 for generating an exciting light beam 5 and a second laser 7 for generating a stimulating light beam 9. First laser 3 is embodied as a mode-coupled titanium:sapphire laser that emits pulses having a repetition rate of approx. 80 MHz. Second laser 7 is an optically parametric oscillator which is pumped by another titanium:sapphire laser that operates in pulsed fashion and is synchronized in terms of pulse train with the first laser. Exciting light beam 5 is focused onto an illumination pinhole 11 and is then reflected by a first beam splitter 13, which is embodied as a 50:50 neutral splitter, to scan module 15, which contains a gimbal-mounted scanning mirror 17 that guides exciting light beam 5, via scanning optical system 19 and optical system 21 and through microscope optical system 23, over or through specimen 25.

Stimulating light beam 9 emerging from second laser 7 passes through module 27 and is combined with exciting light beam 5 by means of second beam splitter 28, which is embodied as a dichroic beam splitter. Module 27 contains a first optical system 29 for spreading stimulating light beam 9, a retardation plate 31 that is embodied as a λ/2 plate and is arranged in such a way that it is transilluminated by the central portion of stimulating light beam 9 while the outer portions pass by, and a second optical system 33 for focusing. Retardation plate 31 is located in a Fourier plane conjugated with the focal plane in specimen 25. It generates an internally hollow focus (see FIG. 4). In this variant embodiment, it functions as a means for influencing the shape of focus 46. Module 27 possesses a thermally insulating, dust-protecting housing 34, and can be aligned by means of alignment devices 35, 36.

Detected light 37 emerging from specimen 25 arrives through microscope optical system 23 and via scanning optical system 19, optical system 21, and scanning module 15 at first beam splitter 13, passes through the latter and detection pinhole 39 after it, and lastly reaches detector 41, which is embodied as a photomultiplier. Electrical detected signals proportional to the power level of detected light 37 emerging from the specimen are generated in detector 39.

The specimen is scanned in layers in order to generate from the detected signals a three-dimensional image of the specimen.

In this exemplary embodiment, excitation of the specimen is accomplished by two-photon excitation. The time interval between the pulses of the exciting light beam and of the stimulating light beam is selected to be shorter than the average lifetime of the excited state of the specimen.

Figure 2:
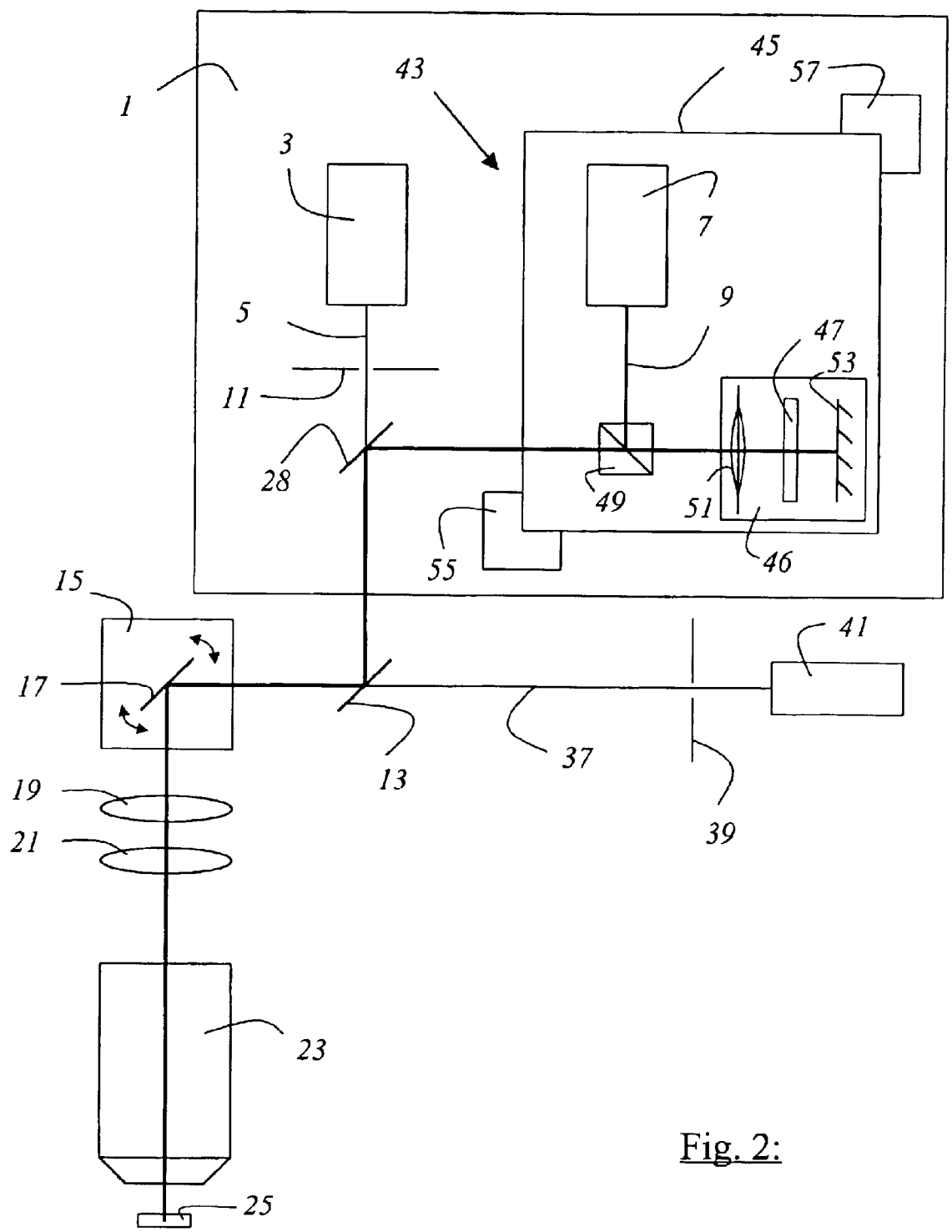
FIG. 2 shows a further scanning microscope according to the present invention.

FIG. 2 schematically shows a scanning microscope having a module 43 that possesses a housing 45 for protection from dust and contamination. The module contains a second laser 7 that generates stimulating light beam 9.

In this embodiment according to the present invention, an LCD element 47 is used to shape the focus of the stimulating light beam. The light emitted by second laser 7 arrives via a beam splitter cube 49 at a spreading optical system 51 and then strikes LCD element 47. In this variant embodiment, LCD element 47 functions as a means for influencing the shape of focus 46. In it, the phase of individual components of the incident exciting light beam can be retarded, pixel by pixel, by $\lambda/4$. Stimulating light beam 9 that has passed through is reflected by a mirror 53, and the components already retarded at the first passage experience a further phase retardation as they pass in reverse through LCD element 47. Stimulating light beam 9 then passes through beam splitter cube 49 and is combined with the exciting light beam at second beam splitter 28. Since each individual pixel can be controlled directly, this arrangement is very flexible and allows modifications even during operation, in particular during the scanning process.

The scanning microscope comprises two banking elements 55, 57 that define a working position of the module. The module can easily be positioned in this working position, and is pressed by pressure elements (not shown), configured as leaf springs, against the banking elements and held in the working position.

Figure 3:
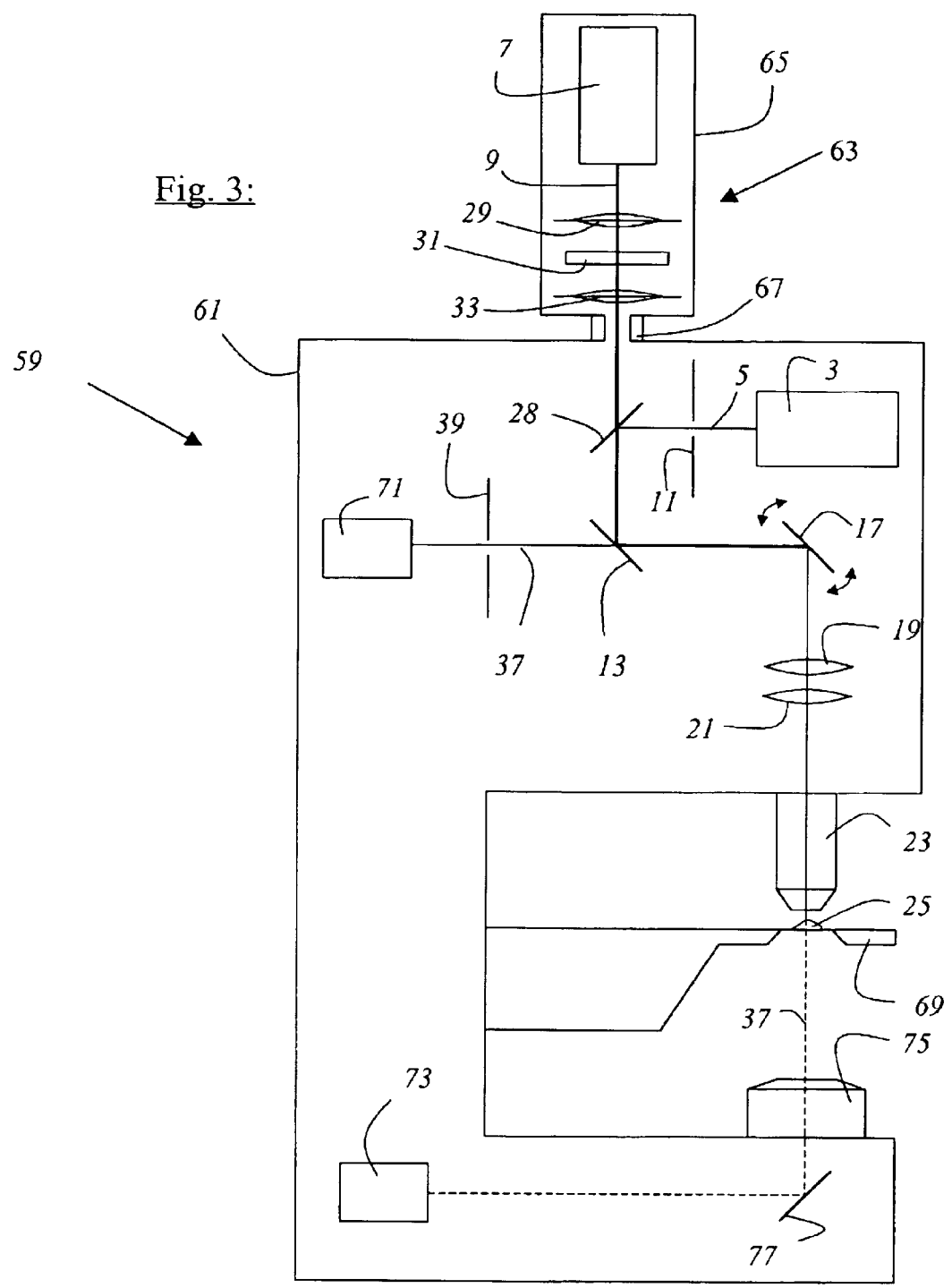
FIG. 3 shows a retrofitted scanning microscope according to the present invention.

FIG. 3 shows a confocal scanning microscope 59 having a stand housing 61, in which access to ultrahigh-resolution scanning microscopy is created by retrofitting with module 63. Module 63 possesses a dust-tight housing 65 having a bayonet attachment 67. Like module 27 already described in FIG. 1, module 63 contains a first optical system 29 for spreading stimulating light beam 9, a retardation plate 31 that is embodied as a $\lambda/2$ plate and is arranged in such a way that it is transilluminated by the central portion of stimulating light beam 9 while the outer portions pass by, and a second optical system 33 for focusing. $\lambda/2$ plate 31 is located in a Fourier plane conjugated with the focal plane in specimen 25. It generates an internally hollow focus. Module 63 furthermore houses a laser 7 that generates stimulating light beam 9 and is embodied as a diode laser. All the elements within module 63 are aligned in such a way that after flange-mounting onto stand housing 61, no further alignment is necessary.

Within confocal scanning microscope 59, the beam paths proceed similarly to the beam paths described in FIG. 1. Stimulating light beam 9 is combined at second beam splitter 28 with exciting light beam 5 that was generated by laser 3. Together with stimulating light beam 9, exciting light beam 5 reaches first beam splitter 13, which reflects the light beams to the gimbal-mounted scanning mirror 17. From there the stimulating light beam and exciting light beam arrive via scanning optical system 19 and optical system 21, and through microscope optical system 23, at specimen 25, which is arranged on a microscope stage 69.

Confocal scanning microscope 59 shown here comprises a descan detector 71 and a non-descan detector 73. The use of non-descan detector 73 is of particular interest especially when specimen 25 is excited using a multi-photon process. In the descan mode, detected light 37 passes through microscope optical system 23 and via optical system 21, scanning optical system 19, and scanning mirror 17 to first beam splitter 13, passes through the latter, and lastly arrives at descan detector 71, which is embodied as a photomultiplier. In the non-descan mode, detected light 37 is collimated by a condenser 75 and passes via mirror 77 to non-descan detector 73. In the non-descan mode, a detection pinhole can be dispensed with.

Figure 4:
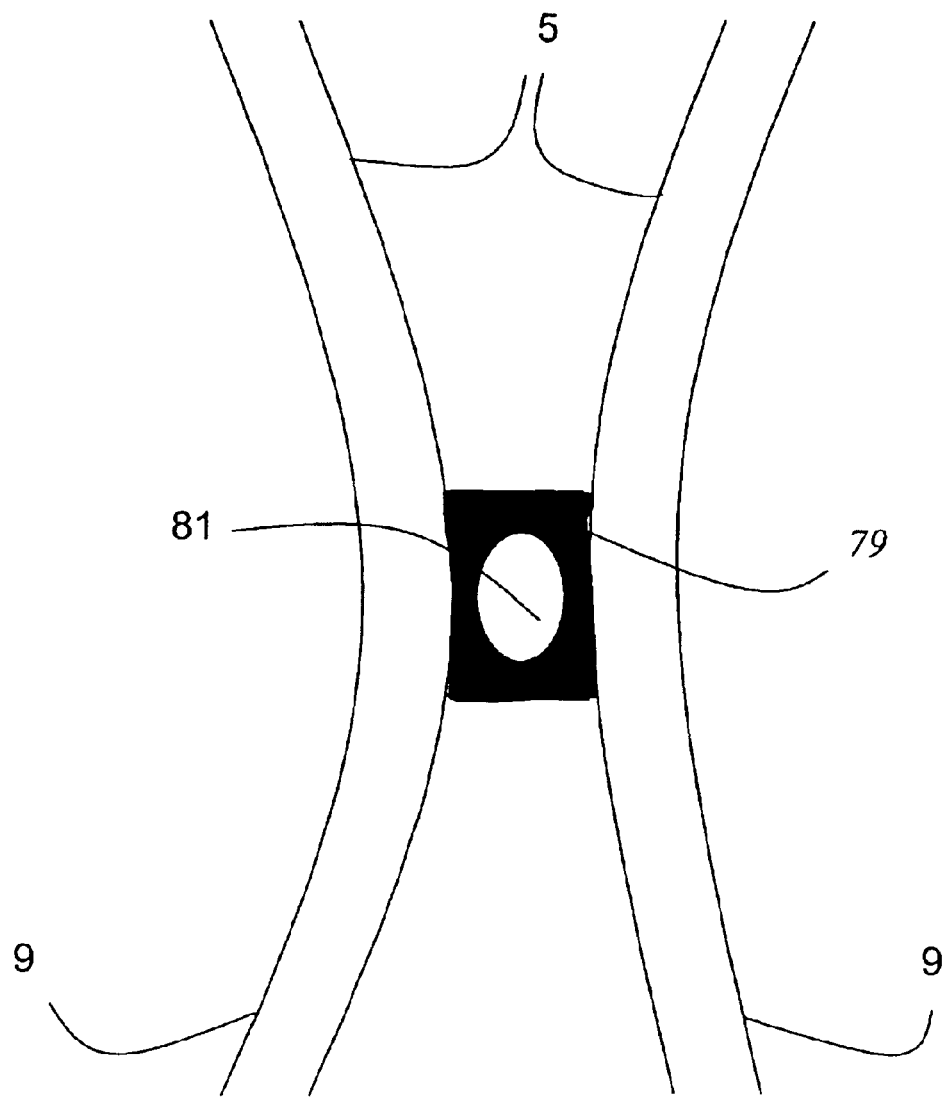
FIG. 4 is a schematic depiction of the configuration of a specific focus shape.

FIG. 4 is a schematic depiction of the configuration of a specific focus shape of stimulating light beam 9, and illustrates the spatial positions of exciting light beam 5 and stimulating light beam 9 within or on the surface of specimen 25 being examined. Stimulating light beam 9 possesses a larger beam diameter than exciting light beam 5, so that exciting light beam 5 is completely surrounded by stimulating light beam 9 in the focus region. Stimulating light beam 9 has an internally hollow focus. The overlap of exciting light beam 5 and stimulating light beam 9 defines in the focus region a three-dimensional overlap region 79 that is depicted in FIG. 4 as a cross-hatched surface. The region that lies in the focus region of exciting light beam 5 and within the hollow portion of stimulating light beam 9 defines emission volume 81.

The invention was described with reference to a particular exemplary embodiment. It is nevertheless self-evident that changes and modifications can be made without thereby leaving the range of protection of the claims recited hereinafter.

What is claimed is:

1. A scanning microscope system, comprising:
   a) a scanning microscope comprising:
      a light source that emits an exciting light beam which is suitable for exciting an energy state in a specimen and that emits a stimulating light beam configured for generating stimulated emission in the specimen, wherein the exciting light beam and the stimulating light beam overlap in a focal region at least partially; and
      at least one detector configured for detection of emitted light proceeding from the specimen; and
   b) a module that is positionable in a beam path of the scanning microscope and adjustable with respect to the scanning microscope, and that comprises multiple optical elements, pre-aligned with respect to each other, which shape the stimulating light beam, wherein the module comprises means for influencing the shape of the focus of the stimulating light beam that generates an internally hollow focus.

2. The scanning microscope system according to claim 1, wherein the module comprises a housing.

3. The scanning microscope system according to claim 1, further comprising an alignment device for alignment of the module with respect to the scanning microscope.

4. The scanning microscope system according to claim 1, wherein the module comprises optics for at least one of spreading and focusing the stimulating light beam.

5. The scanning microscope system according to claim 1, wherein the module comprises at least one retardation plate.

6. The scanning microscope system according to claim 1, wherein the multiple optical elements comprise a liquid crystal array.

7. The scanning microscope system according to claim 1, wherein the multiple optical elements comprise a retardation plate that is transilluminated by a portion of the stimulating light beam.

8. The scanning microscope system according to claim 1, wherein the stimulating light source is a laser.

9. A module for a scanning microscope system, comprising:

multiple optical elements, pre-aligned with respect to each other, which are configured to shape a stimulating light beam, wherein the module is configured to connect to a scanning microscope so that it is adjustable with respect to the scanning microscope and positionable in a beam path of the scanning microscope, and wherein the scanning microscope comprises:

a light source that emits an exciting light beam which is suitable for exciting an energy state in a specimen and that emits said stimulating light beam configured for generating stimulated emission in the specimen, wherein the exciting light beam and the stimulating light beam overlap in a focal region at least partially;

at least one detector configured for detection of emitted light proceeding from the specimen; and means for influencing the shape of the focus of the stimulating light beam in a focal plane, wherein the means for influencing the shape of the focus of the stimulating light beam in the focal plane generate an internally hollow focus.

10. The module according to claim 9, further comprising a housing.

11. The module according to claim 9, further comprising an alignment device for alignment of the module with respect to the scanning microscope.

12. The module according to claim 9, wherein the module comprises optics for at least one of spreading and focusing the stimulating light beam.

13. The module according to claim 9, further comprising at least one retardation plate.

14. The module according to claim 9, wherein the stimulating light source is a laser.

15. The module according to claim 9, wherein the multiple optical elements comprise a liquid crystal array.

16. The module according to claim 9, wherein the multiple optical elements comprise a retardation plate that is transilluminated by a portion of the stimulating light beam.

17. A scanning microscope system, comprising:

a) a scanning microscope comprising:

a light source that emits an exciting light beam which is suitable for exciting an energy state in a specimen and that emits a stimulating light beam configured for generating stimulated emission in the specimen, wherein the exciting light beam and the stimulating light beam overlap in a focal region at least partially; and at least one detector configured for detection of emitted light proceeding from the specimen; and b) a module that is positionable in a beam path of the scanning microscope and adjustable with respect to the scanning microscope, and that comprises multiple optical elements, pre-aligned with respect to each other, which shape the stimulating light beam, wherein the module comprises optics to influence the shape of the focus of the stimulating light beam that generates an internally hollow focus.

* * * * *